(12) United States Patent
Richards et al.

(10) Patent No.: US 7,252,325 B2
(45) Date of Patent: Aug. 7, 2007

(54) WORK VEHICLE CAB SCREEN

(75) Inventors: John D. Richards, Lisbon, ND (US); Gerald M. Berg, Lisbon, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 114 days.

(21) Appl. No.: 10/985,091

(22) Filed: Nov. 10, 2004

(65) Prior Publication Data

US 2005/0104416 A1    May 19, 2005

Related U.S. Application Data

(63) Continuation-in-part of application No. 10/619,338, filed on Jul. 14, 2003, now abandoned.

(51) Int. Cl.
B62D 25/06    (2006.01)
(52) U.S. Cl. ............... 296/190.08; 180/89.12; 52/673; 428/131; 428/596
(58) Field of Classification Search ........... 296/190.08, 296/190.11; 293/115; 49/50; 29/897.15; 180/68.6, 89.12; 52/673, 675; 428/131, 428/134, 596; 280/756
See application file for complete search history.

(56) References Cited

U.S. PATENT DOCUMENTS

| | | | |
|---|---|---|---|
| 1,076,017 A | 10/1913 | Chase | 52/180 |
| 1,792,078 A | 2/1931 | Davis | |
| 1,814,598 A | 7/1931 | Herrmann | 29/897.15 |
| 1,894,715 A | 1/1933 | Smith | 160/89 |
| 2,054,538 A | 9/1936 | Graves et al. | 293/54 |
| 2,609,781 A | 9/1952 | Gruetjen | 29/6.2 |
| 4,055,262 A | 10/1977 | Bauer et al. | 214/140 |
| 4,079,985 A * | 3/1978 | Martin | 296/190.03 |
| D247,814 S | 5/1978 | Johnson et al. | D15/23 |
| 4,133,481 A * | 1/1979 | Bennett | 238/14 |
| D251,088 S | 2/1979 | Johnson et al. | D15/23 |
| 4,167,599 A * | 9/1979 | Nissinen | 428/44 |
| 4,184,712 A | 1/1980 | Skahill | 296/190 |
| 4,205,874 A * | 6/1980 | Martin | 296/102 |
| 4,221,038 A | 9/1980 | Singer et al. | 29/897.15 |
| D259,631 S | 6/1981 | Ramacciotti | D12/57 |
| 4,408,672 A | 10/1983 | Albright et al. | 180/89.14 |
| D271,397 S | 11/1983 | Kuhn et al. | D15/25 |
| 4,940,280 A | 7/1990 | Templeton | 296/190 |
| D314,389 S | 2/1991 | Lynnes et al. | D15/25 |

(Continued)

FOREIGN PATENT DOCUMENTS

EP    1 066 998 A2    7/2000

(Continued)

*Primary Examiner*—Joseph D. Pape
(74) *Attorney, Agent, or Firm*—Michael Best & Friedrich LLP (57) ABSTRACT

A side screen for the cab of a work vehicle, such as a skid steer loader, comprises a panel having strips defining openings therebetween. A high percentage of the area of the screen is open for visibility. At least one reinforcing member, such as a rib, is formed in the screen, such as on a strip or on a panel section. An intermediate panel may also provide a section of relatively heightened rigidity. Such reinforcing members reduce sheet bowing, or "oil can" effect, and maintain flatness of the screen, thereby optimizing the screen for a combination of both protection and visibility.

25 Claims, 6 Drawing Sheets

U.S. PATENT DOCUMENTS

| | | |
|---|---|---|
| D317,926 S | 7/1991 | Lynnes et al. ................ D15/25 |
| 5,050,700 A | 9/1991 | Kim ........................... 180/268 |
| D322,792 S | 12/1991 | Park ........................... D15/25 |
| 5,078,568 A | 1/1992 | Lynnes ....................... 414/680 |
| 5,240,366 A | 8/1993 | Bamford ..................... 414/686 |
| 5,247,825 A | 9/1993 | Erickson ....................... 72/339 |
| D376,372 S | 12/1996 | Little et al. .................. D15/23 |
| 5,807,061 A | 9/1998 | Donoghue et al. .......... 414/710 |
| 5,941,330 A | 8/1999 | Miller et al. ............. 180/89.15 |
| D419,568 S | 1/2000 | Baig et al. ................... D15/25 |
| D424,778 S | 5/2000 | Dahl et al. ................... D34/34 |
| 6,102,471 A | 8/2000 | Sasser et al. ........... 296/190.05 |
| D437,862 S | 2/2001 | Shaw .......................... D15/28 |
| 6,189,954 B1 | 2/2001 | Martin, Jr. ............. 296/190.08 |
| D450,718 S | 11/2001 | Muraro ........................ D15/25 |
| 6,382,711 B2 | 5/2002 | Martin, Jr. ............. 296/190.08 |
| 6,416,112 B1 | 7/2002 | Trivits ........................ 296/136 |
| 2001/0008346 A1 | 7/2001 | Martin, Jr. ............. 296/190.08 |

FOREIGN PATENT DOCUMENTS

EP        1 066 998 A3    7/2000

\* cited by examiner

WORK VEHICLE CAB SCREEN

CROSS-REFERENCE TO RELATED APPLICATIONS

This application is a continuation-in-part of, and claims the benefit of, U.S. patent application Ser. No. 10/619,338 entitled "WORK VEHICLE CAB SCREEN", filed Jul. 14, 2003, now abandoned which is incorporated by reference herein.

BACKGROUND OF THE INVENTION

The present invention relates to a cab side opening screen used on vehicles, such as a skid steer loader or similar vehicles, where a rollover protection cab is provided that has side openings over which screens are placed. The screens generally are made of a metal panel that is relatively thin and which has holes punched out thereof, often roughly rhombus-shaped, with narrow strips of material remaining between the holes.

Skid steer loaders have for many years utilized rollover protection type cabs that provide an overhead frame, and with screens or grates on side openings of the cab that provide operator visibility and that afford protection. This type of screen is shown in various skid steer loader patents, for example, in design patents D419,568 and D317,926.

U.S. Pat. Nos. 6,189,954 and 6,382,711 and U.S. patent application publication US2001/0008346 show the use of this type of sheet metal side screen or grate with stationary window assemblies that are attached to the screen. The side window assemblies in these two patents and the publication do not slide relative to the screens, but in some cases it is desirable to have windows which can open by sliding a window section relative to the side screens or grates. Problems can arise if the screens or grills are not flat, are bent or distorted, or exhibit what is known to those in the art as an "oil can" effect. Binding of the window sliding relative to the grill or side screen can occur.

SUMMARY OF THE INVENTION

The present invention relates to a side screen for a cab on a work vehicle that is formed from a metal panel or sheet with sufficient openings formed or punched therethrough to permit the operator to see through it, but yet provide protection to such operator. The grills or screens are generally formed by punching rhomboid-shaped openings or apertures, about 2 inches by 2 inches in size in one illustrative embodiment, in a metal sheet, leaving an integral matrix or network of intersecting steel strips surrounding the openings.

In an illustrative embodiment, the strips extend generally vertically and generally horizontally, and ribs are formed across selected numbers of strips, along the narrow dimension thereof. The ribs are formed about in the center of the length of each selected strip, in one embodiment. The forming of the ribs compensates for stresses that are unavoidable in some methods of providing openings that provide a high percentage of open space. After punching the openings in a side panel, the panel is subject to being curved substantially from a plane.

The strips can be formed to be thinner in lateral width than traditionally, using one of the advantageous aspects of the teachings of the present invention. That means that visibility through the openings is increased, since there is a larger percentage of open space in the sheet remaining after punching out the openings, in various embodiments. The side screen warp is also overcome so that the screen is flat after forming the ribs.

The controlled side screen flatness as a result of forming ribs in portions of the screen, including individual strips between the openings, ensures that sliding windows adjacent the screen are more easily accommodated in certain embodiments.

The ribs are formed in a stamping operation, using a suitable die, in an illustrative embodiment. In one aspect, forming the ribs on the horizontal strips in one direction perpendicular to the plane of the side screen (inwardly) and forming the ribs in the generally vertical strips in the other direction perpendicular to the plane of the side screen (outwardly), also aids in insuring a flat screen.

The ribs can be extended into the solid portions of the panels to aid also in reducing stresses on the panels.

DETAILED DESCRIPTION OF PREFERRED EMBODIMENTS

Figure 1:
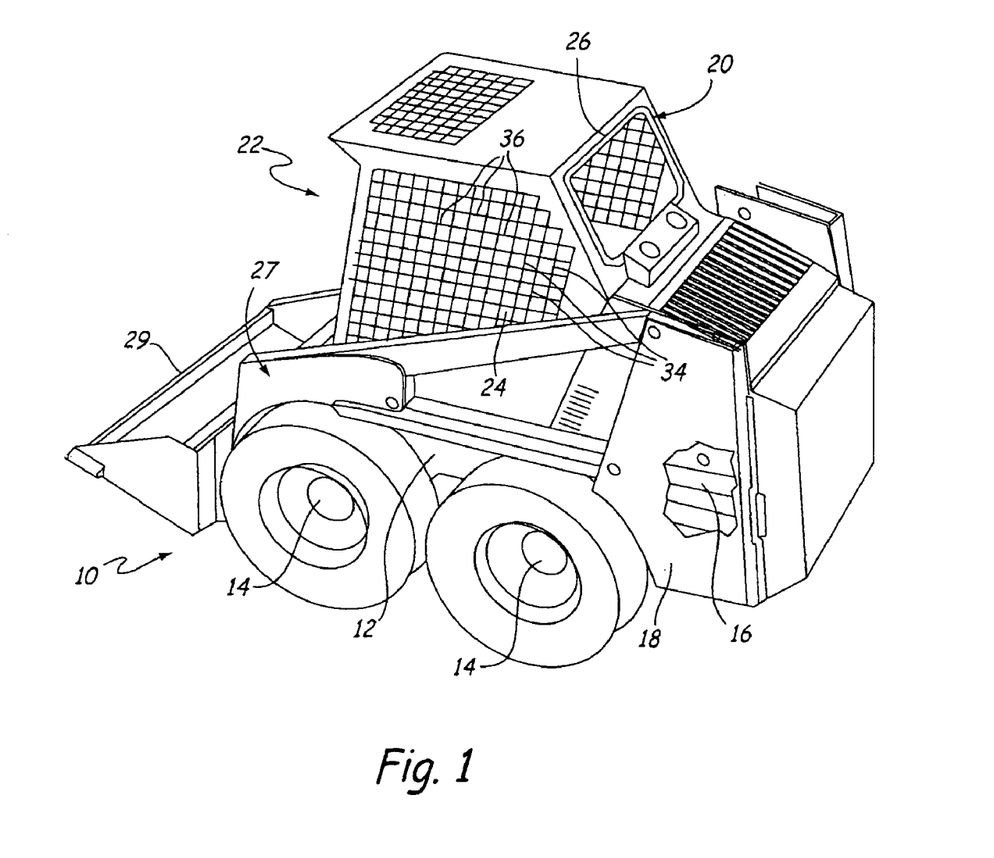
FIG. 1 is a perspective view of a typical skid steer loader comprising an industrial work vehicle having a side screen made according to one embodiment of the present invention.

FIG. 1 depicts a skid steer loader 10 that includes a frame 12, mounted on wheels 14 that are driven through a suitable power train, such as hydraulic motors that in turn are driven from pumps. The pumps are driven from an engine 16 mounted in an engine compartment 18 that is to the rear of an operator's cab or enclosure 20. The operator's cab 20 is entered and exited from the front indicated at 22, in this embodiment.

The cab 20 includes a rollover protection framework 26, as is common for an industrial work vehicle. The loader shown has pivoting arms 27 that can be raised and lowered under power by operating hydraulic cylinders 28 in a normal manner. A bucket 29 or other tool is supported on the arms 27.

Side screens 24 are provided along the sides of the cab 20. Side screens 24 provide visibility and protection to an occupant of cab 20. Side screens 24 are formed with generally vertical and generally horizontal strips, defining an array of generally rhomboid openings between the strips, in this illustrative embodiment. In accordance with this embodiment, ribs are formed in the strips to flatten the screens after punching the openings, and to reduce distortion and the "oil can" effect of the side screens. These ribs are an example of various types of reinforcing members incorporated into the screen in various embodiments.

Figure 2:
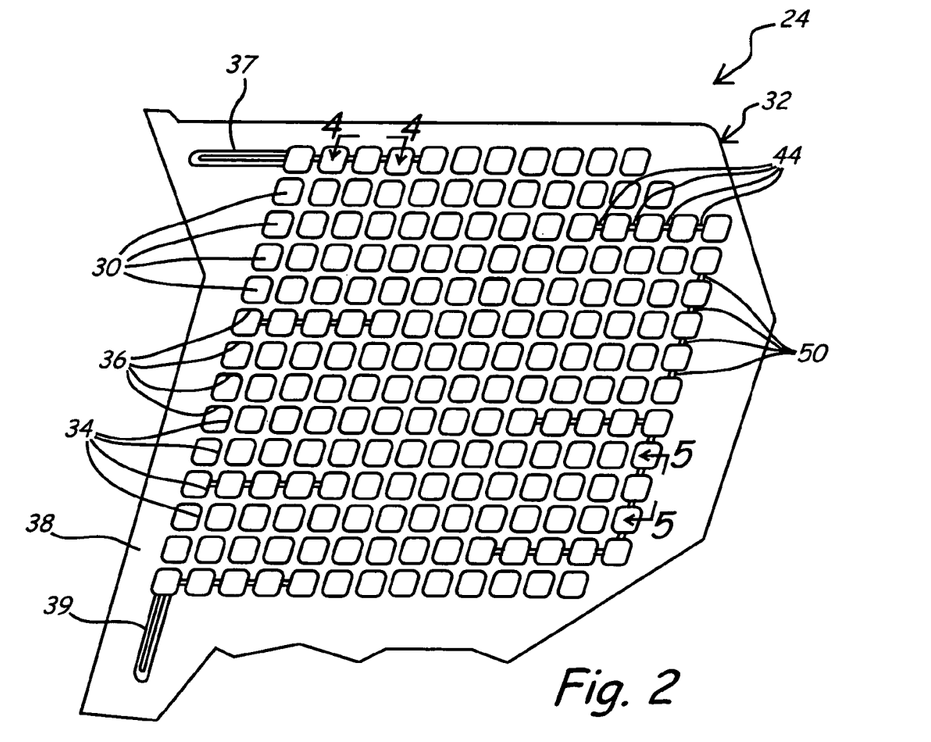
FIG. 2 is a side view of an industrial work vehicle cab, as shown, a skid steer loader cab, having a side screen made according to one embodiment of the present invention.

FIG. 2 is an enlarged side view of a typical side screen 24 found on cab 20, according to one illustrative embodiment. As can be seen, the screen 24 is made with an array of solid strips 34, 36 in a panel or sheet 32 of a solid material such as metal, such that strips 34, 36 surround and define openings 30. Openings 30 may be formed by being punched out of panel 32, for example, or by any other method that may be known to those in the art. Screen 24 also includes various reinforcing members, such as ribs 44 on selected vertical strips 34, ribs 50 on selected horizontal strips 36, and panel ribs 37, 39 on panel section 38. Reinforcing members 44, 50, 37, 39 protrude perpendicularly to screen 24, thereby providing added rigidity to screen 24 and minimizing oil can effect. The formation, structure, and function of these illustrative reinforcing members 44, 50, 37, 39 are elaborated below.

The formation of the openings 30 produces an array of generally vertical strips 34, and a plurality of generally horizontal strips 36, in this embodiment. Each of the openings 30 is thereby surrounded by two generally vertical strips 34 and two generally horizontal strips 36, except for the openings that are at the edges, where a wider panel section 38 of material is at the outer edge of screen 24 surrounding openings 30. Panel section 38 forms a frame substantially surrounding the array of strips 34, 36.

The generally vertical strips 34 are moderately inclined from a true vertical in this illustrative embodiment. Similarly, the generally horizontal strips 36 may not be precisely horizontal in this embodiment. Strips having other inclinations from true horizontal or true vertical, or having any other inclinations, may occur for the generally horizontal rows and generally vertical columns of a screen in various embodiments. This should also take into account the tilt of a loader 10 in a work environment, where the loader 10 itself is regularly tilted to a forward or backward pitch, such that a broad range of alignments of the rows and columns of the screen would assume a broad range of angles that would reasonably be described as generally horizontal and generally vertical.

In still other embodiments, an array with three alignments of strips may be formed, such as one alignment that is substantially horizontal, a second alignment that is tilted approximately 60 degrees clockwise from horizontal, and a third alignment that is tilted approximately 60 degrees counterclockwise from horizontal, defining substantially hexagonal openings between them, for example. In still other embodiments, the openings may be punched out of panel 32 in a substantially circular form, for example, rather than a substantially rhomboid form as in the embodiment of FIG. 2. These examples are illustrative of a wide variety of arrays of strips in the screen in additional embodiments encompassed within the present invention.

The sheet of solid material from which screen 24 is made is generally in the range of 0.125 inches thick in the embodiment depicted in FIG. 2, although that thickness can vary as needed in other embodiments. For example, different applications may involve a panel thickness of between 0.080 to 1.0 inches in various embodiments, or anywhere from a few mils to several inches in other embodiments.

In one illustrative embodiment, the material of which screen 24 is made is a mild steel that is well-suited for being die formed and punched. Various grades of steel, or any of a wide variety of different metals or other solid materials, may be used in different embodiments. Screens having laser cut openings are also made in other embodiments, and material type and material thicknesses can vary when that manufacturing technique is used. The panel material is capable of permitting the openings 30 to be formed in a suitable manner.

Figure 3:
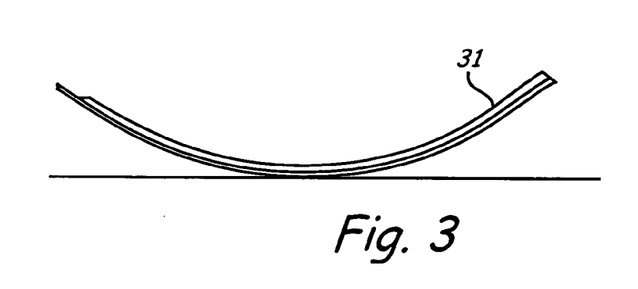
FIG. 3 is an exaggerated, schematic representation of the curved or "oil can" shape of a side screen after punching openings in a panel and before adding the ribs of the present invention.

A side screen may be distorted or warped, rather than flat, after punching or forming the openings 30 defined by the array of generally vertical strips 34 and generally horizontal strips 36 due to stresses in the strips that remain. FIG. 3 is an exaggerated illustrative side view of a side screen 31 in an intermediate stage of manufacture, after openings are punched therein, to illustrate the bowing or "oil can" effect. The screen depicted has curled from internal stresses, caused by punching the openings. In actual practice, the total distortion or bowing of a free edge of a typical punched opening screen can be six inches or so with one edge of the screen held on a floor surface, for example.

An illustrative embodiment includes another step in forming a screen, one objective of which is to remedy a warping, bowing or oil can effect such as that depicted in FIG. 3 (depicting a screen prior to formation of any reinforcing members thereon). At least one reinforcing member is disposed in the array of strips on the screen, and at least one reinforcing member is disposed on a panel section of the screen, in various embodiments. For example, transverse or offset ribs may be formed in a plurality of the generally vertical strips 34 and/or generally horizontal strips 36, such as ribs 44, 50 respectively in FIG. 2. As another example, panel ribs may be disposed on a panel section 38 of the screen 24, such as illustrative panel ribs 37, 39 in FIG. 2.

Figure 4:
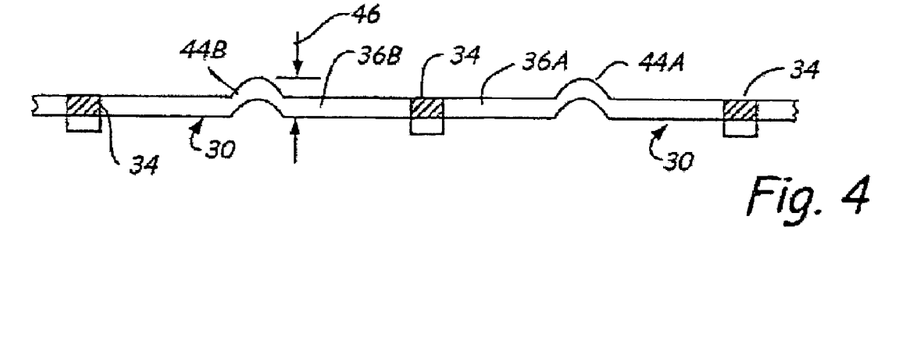
FIG. 4 is an enlarged sectional view taken along line 4-4 in FIG. 2.

FIG. 4 is a sectional side view corresponding at least in part to a portion of the embodiment depicted in FIG. 2. FIG. 4 depicts a top-down, generally vertical view of a portion of screen 24. This includes a parallel view of a few generally vertical strips 34, and a perpendicular view of a few generally horizontal strips 36A, 36B, as examples of generally horizontal strips 36. As can be seen, generally horizontal strips 36A and 36B are formed illustratively with ribs 44A and 44B, that are formed out of the plane of screen 24 a distance indicated by double arrow 46, as the plane of screen 24 is locally defined. This depth of the offset or formed rib is illustratively in the range of between 0.040 to 0.080 inches, with a preferred offset of about 0.063 using the 0.125 inch thick material, in one illustrative embodiment.

The depth of offset of displacement of the ribs, and the forming radius will be varied in other embodiments, depending on the material composition, the thickness and the process used for forming the openings. The depth of a rib is the distance from the top of the rib to the surface of the strip from which it was formed, as indicated by double arrow 46. This may also be considered the distance by which a rib 44 protrudes from the plane of the screen 24. Even though screen 24 does not define a perfect plane, its local constituent materials may define a local plane for purposes of measuring the protrusion distance 46 of a rib 44.

Ribs 44 extend across the width or lateral dimension of each of a selected number of the generally horizontal strips 36 in FIG. 2, such as exemplary generally horizontal strips 36A, 36B in FIG. 4. This selected number may be anywhere from only one strip 36, to all available generally horizontal strips 36, in various embodiments. Generally horizontal strips 36 are formed so that ribs 44 extend outwardly from cab 20 in a direction perpendicular to the plane of panel 32, in the illustrative embodiment of FIG. 4. This direction outward from cab 20 corresponds to upward toward the top of the page in the depiction of FIG. 4, and corresponds in the depiction of FIG. 2 to perpendicularly above the plane of the paper.

Figure 5:
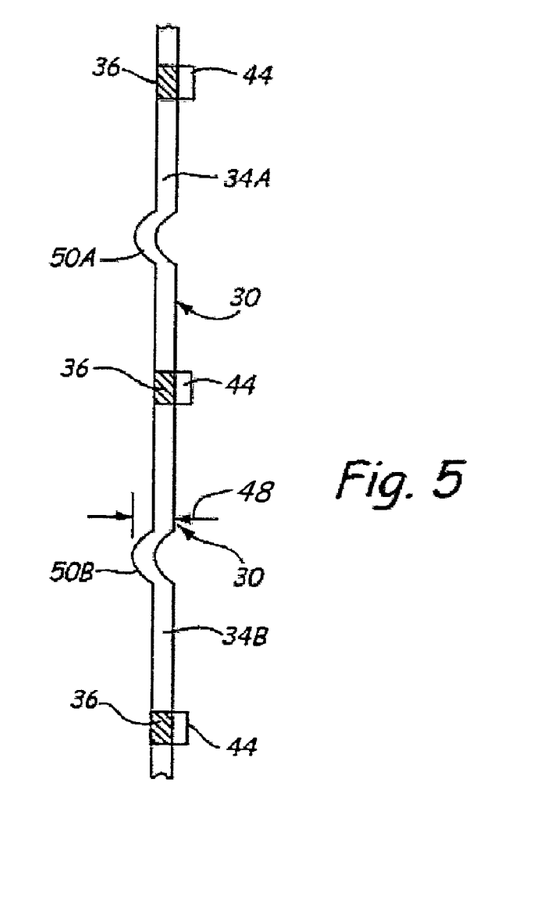
FIG. 5 is an enlarged sectional view taken as on line 5-5 in FIG. 2.

FIG. 5 is a sectional side view corresponding at least in part to a portion of the embodiment depicted in FIG. 2. FIG. 5 depicts a generally horizontal side view of a portion of screen 24. This includes a view parallel to a few generally horizontal strips 36, and a perpendicular view of a few generally vertical strips 34A, 34B, as examples of generally vertical strips 34. As can be seen, generally horizontal strips 34A, 34B are formed illustratively with ribs 50A, 50B, that are formed out of the plane of the respective strip a distance indicated by double arrow 48. This depth of the offset or formed rib may be of a similar range as the depth 46 indicated above, in various embodiments. Ribs 50A, 50B, 44A and 44B may protrude perpendicularly to the screen 24 in the same perpendicular direction, or in both directions that are perpendicular to screen 24, and opposite each other. A rib need not protrude precisely perpendicularly, and rarely does. Rather, ribs 50A, 50B, 44A and 44B comprise protrusions having a component of extension perpendicular to the screen 24.

Vertical strip ribs 50 extend across the width or lateral dimension of each of a selected number, including at least one, of the generally vertical strips 34 in FIG. 2, such as exemplary generally vertical strips 34A, 34B in FIG. 5. This selected number may be anywhere from only one strip 34, to all available generally vertical strips 34, in various embodiments. Similarly, different embodiments may have one or more vertical strip ribs 50 without any horizontal strip ribs 44, or one or more horizontal strip ribs 44 without any vertical strip ribs 50, or a combination of one or more of each of vertical strip ribs 50 and horizontal strip ribs 44.

Generally vertical strips 34 are formed so that ribs 50 extend inwardly toward cab 20 in a direction perpendicular to the plane of panel 32, in the illustrative embodiment of FIG. 5. This direction inward toward cab 20 corresponds to leftward toward the left side of the page in the depiction of FIG. 5, and corresponds in the depiction of FIG. 2 to perpendicularly below the plane of the paper.

The number of rows or lines of the ribs in each of the generally vertical or generally horizontal directions is preferably a sufficient plurality to retain side screen 24 in a generally flat condition, enough for the satisfactory operation of side screen 24 according to the understanding of those in the art. Thus the selected number of strips having the ribs 44, 50 is enough so that the side screen remains generally flat. This may mean the side screen is flat enough for satisfactory function as installed in a loader, for example. It may mean that the side screen is optimized for a combination of protection and visibility for the occupant of a cab protected thereby. This may include only one rib in some embodiments, either along generally vertical strips 34 or generally horizontal strips 36, depending on other factors of the embodiment such as type and thickness of screen 24. In other embodiments this may include any number of ribs either along generally vertical strips 34 or generally horizontal strips 36, or a combination of the two.

Figure 6:
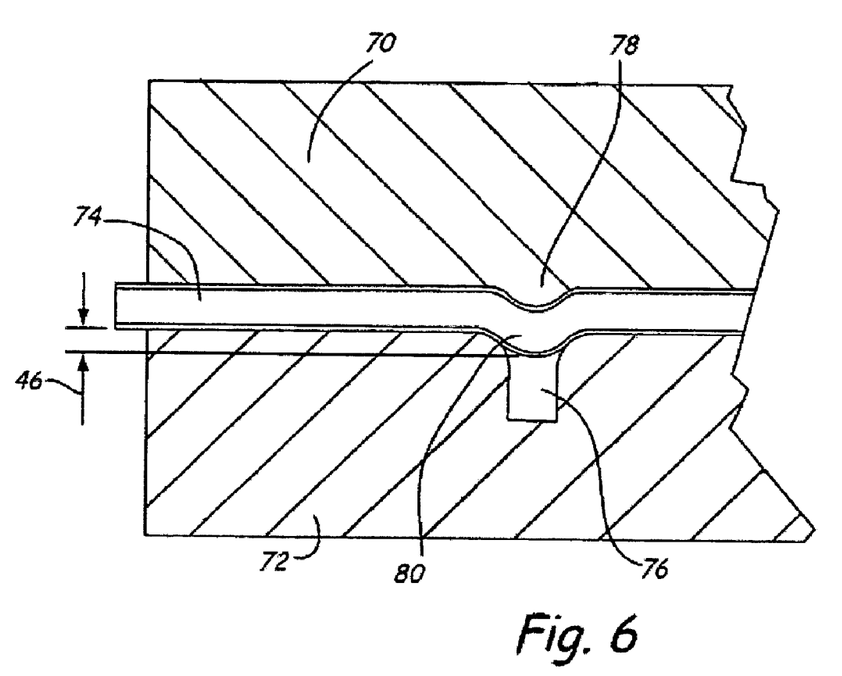
FIG. 6 is a sectional view of a typical forming die used to form the ribs of the present invention in the strips between the openings.

FIG. 6 is a view of a typical forming die for the ribs that includes a first punch member 70 and a second die member 72 in which a panel or sheet of material 74, which will become screen 24 or a part thereof, is positioned. The die 72 has a recess 76, and a punch end 78 in punch member 70 is used to form a rib in panel 74. The punch member 78 has an end formed in a radius selected to provide a desired inner radius of the rib. The formed rib is indicated at 80 in FIG. 6 and is formed out of the screen or panel material 74. The ribs can be formed in any of the selected vertical or horizontal sections, and all of the selected ribs can be die formed at one time. A rib thus formed may also be positioned on any of a variety of locations on sheet 74, including positions corresponding to a strip, a panel, or a peripheral panel section of screen 24, for example.

FIGS. 7-11 show another location for ribs disposed in an array of strips and on panel sections of the screen. In this instance, a side screen 100 is made up of a plurality of rhomboid shaped openings indicated generally at 104 punched out of a panel sheet 102 of metal. There are strips surrounding the openings 104, including generally vertical strips 106, and generally horizontal strips 108. In addition, there are rigid panel sections of metal surrounding the cluster of openings 104, including forward panel section 110 and aft panel section 112 occupying parts of the periphery of screen 100, in the illustrative embodiment of FIG. 7.

Figure 7:
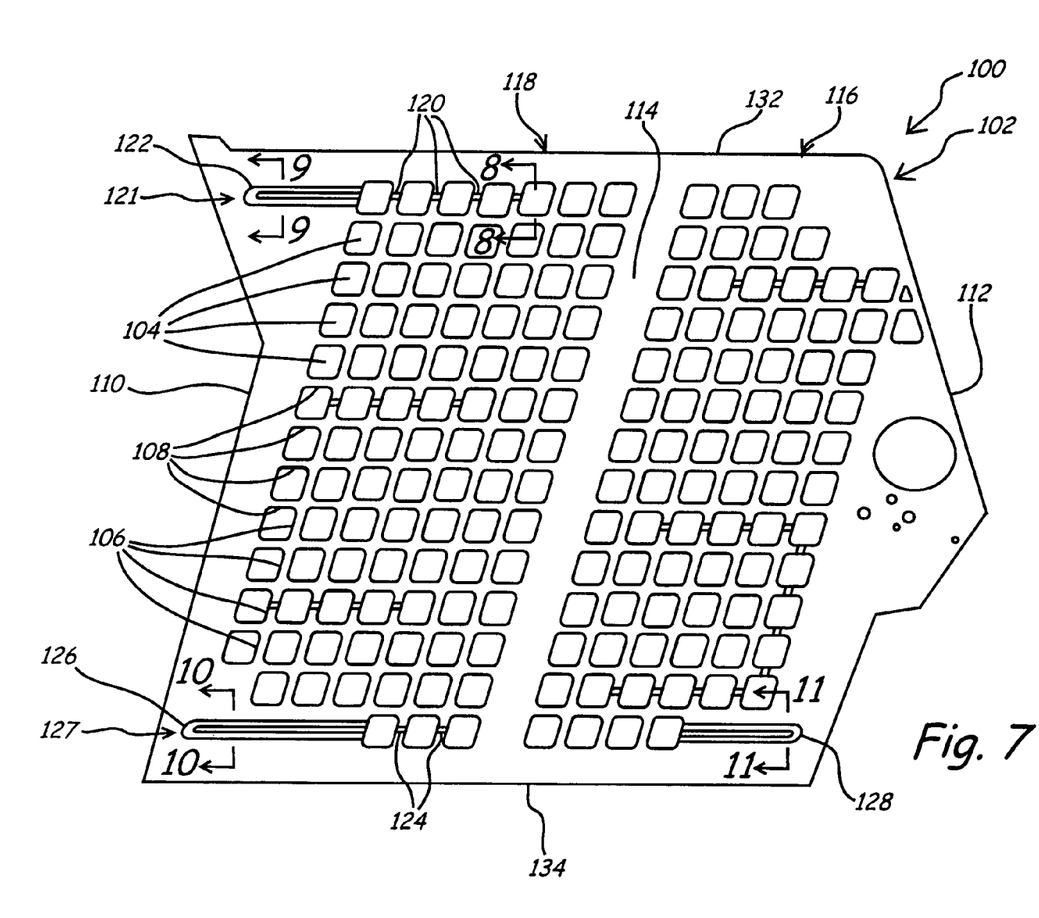
FIG. 7 is a side view of a side screen with ribs formed in selected locations across openings.

The view in FIG. 7 is of the interior side of screen 100, which is the right-hand side screen for cab 20. In the embodiment of FIG. 7, there is also a generally vertical intermediate panel 114 crossing a laterally intermediate portion of side screen 100, providing a generally more rigid structure than the surrounding array of generally vertical strips 106 and generally horizontal strips 108. This intermediate panel 114 separates screen 100 into a separate aft panel section 116 and forward panel section 118. Similarly, intermediate panel 114 divides the greater array of strips defining rhomboid-shaped openings 104 into an aft array of strips on aft panel section 116 between the intermediate panel 114 and aft panel section 112, and a forward array of strips on forward panel section 118 between the intermediate panel 114 and forward panel section 110, in this embodiment. In additional embodiments, the array of strips may be divided by more than one intermediate panel; or by an intermediate panel having a different orientation such as generally horizontal, for example. An intermediate panel may also have panel section ribs disposed thereon, in various embodiments.

In this embodiment, the aft section 116 is offset from the plane of the main panel 102, from the top to the bottom, to provide a recess for a cab window (not depicted in FIG. 7) that may be positioned substantially in the plane of the main panel 102. The offset of aft section 116 is conventionally done by any of several means known in the art, such as stamping, for example.

The offset of aft panel section 116 for placement of an adjacent window may itself contribute to maintaining the flatness of screen 100. This is true even while aft panel section 116 comprises what can be considered its own separate array of strips 106, 108, where this array comprises further reinforcing members including strip ribs and panel rib 128. A plurality of generally vertical ribs 120 are formed in a selected number of the generally vertical strips 106 that separate the openings 104, in both the forward panel section 118 and the aft panel section 116.

Figure 8:
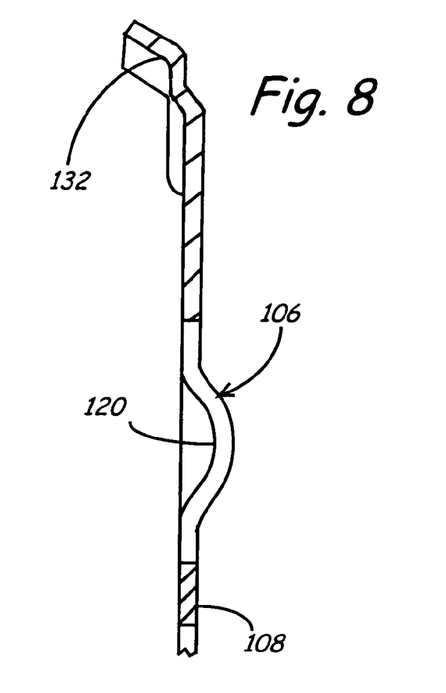
FIG. 8 is a sectional view taken on line 8-8.
Figure 9:
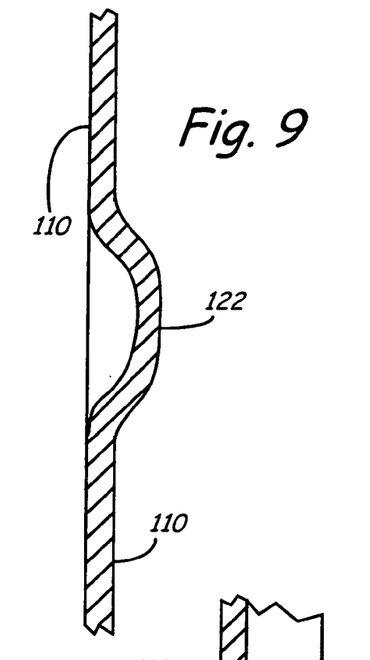
FIG. 9 is a sectional view taken on line 9-9 in FIG. 7.

Some of the generally vertical ribs 120 depicted illustratively in FIG. 7 are disposed along an upper row of generally vertical strips 106 in the array of strips comprised in forward panel section 118. In the illustrative embodiment depicted in FIG. 7, these ribs 120 span across an upper row 121 of the strips 106, but do not cross to the rear of intermediate panel 114. An illustrative generally vertical rib 120 is also depicted in FIG. 8 in a generally horizontal side view.

In the embodiment of FIG. 7, one of the distinctions between intermediate panel 114 and strips 106, 108 formed in panel 102, includes that intermediate panel 114 constitutes a much wider intact section of panel 102, thereby retaining much more rigidity than strips 106, 108. It is therefore preferred in this embodiment for ribs formed among the generally vertical strips 106, to contribute horizontal reinforcement to complement the substantial vertical reinforcement provided by generally vertical panel 114.

Additionally, in this instance, a generally horizontal panel rib 122 is formed in an upper forward corner portion of forward section 118, i.e. in an upper portion of forward panel section 110. Rib 122 is also depicted in a generally horizontal side view in FIG. 9. Generally horizontal panel rib 122 provides significant horizontal reinforcement to screen 100, to complement further the generally vertical reinforcement provided by generally vertical intermediate panel 114. Rib 122 on panel 110 also contributes greater added rigidity to screen 100 than any single one of ribs 120 on generally vertical strips 106, in this embodiment. In various embodiments, any combination of one or more panel ribs, and/or one or more strip ribs, and/or one or more intermediate panels, may be used to provide screen 100 with an appropriate pattern and level of rigidity reinforcement. Various additional ribs are depicted on both vertical and horizontal strips in FIG. 7.

Additional generally vertical ribs 124 are formed on a lower row 127 of strips 106 near the bottom of forward section 118 of screen 100, in the embodiment of FIG. 7. A representative strip 106 with rib 124 is depicted in a side view in FIG. 10. Also depicted in FIG. 10, edge-on, are a generally horizontal strip 108 on the upper side of generally vertical strip 106, and lower panel section 134 on the lower side of generally vertical strip 106.

Figure 10:
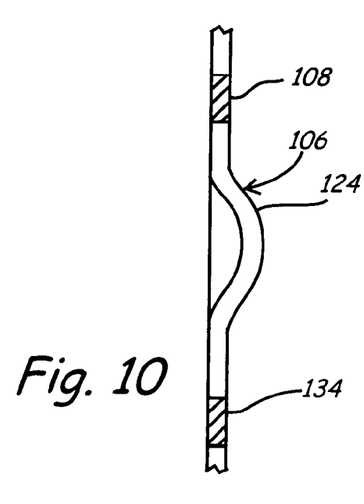
FIG. 10 is a sectional view taken on line 10-10 in FIG. 7.

Panel rib 126 is obscured from view behind strip rib 124 in the view of FIG. 10. Panel rib 126, as depicted on FIG. 7, is formed in a lower forward corner portion of forward section 118, i.e. in a lower portion of forward panel section 110. Panel rib 126, similar to panel rib 124, is also a generally horizontal panel rib that provides significant horizontal reinforcement and added rigidity to screen 100. Panel rib 126 is another illustrative example of the wide variety of potential reinforcing members encompassed in different embodiments.

Figure 11:
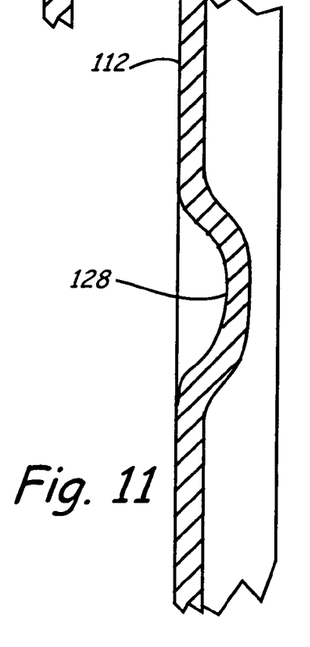
FIG. 11 is a sectional view taken on line 11-11 in FIG. 7.

A lower aft panel rib 128 is also formed in a lower corner of aft panel section 112, i.e. in a lower portion of aft section 116, as depicted in FIG. 7 and in a generally horizontal side view in FIG. 11. Panel rib 128 is aligned with lower row 127 of the openings in the side screen 100, and with panel rib 126, in the illustrative embodiment of FIG. 7. Panel rib 128 is yet another illustrative example of various reinforcing members that may be used in different embodiments.

The forming of the ribs 120, 124 in a selected number of the upright strips 106 in upper row 121 and lower row 127, as well as using additional ribs 122, 126, 128 at various corners of screen 100, has been found to adequately relieve the stresses to maintain screen 100 flat, in the illustrative embodiment of FIGS. 7-11. Similar embodiments also adequately relieve the stresses to maintain screen 100 flat, including those with ribs in any of the four corners or a combination of corners or other positions of screen 100, those with ribs along other rows or combinations of rows of the generally vertical strips 106, those with a different placement or dimension of generally vertical, solid panel section 114, or any combination of these factors.

Ribs 120 and 124 are formed on generally vertical strips, and panel ribs 122, 126 and 128 are generally horizontal, in the embodiment of FIG. 7. All of these ribs are formed perpendicular to panel 102 in the direction "downward" into the page and toward the exterior of the cab 20, in the embodiment shown in FIG. 7. That is, the view in FIG. 7 is of the interior side of screen 100, which is the right-hand side screen for cab 20. The embodiment of FIG. 7 is one illustrative embodiment that has been found to maintain screen 100 flat for better mounting of windows and the like.

Forming the ribs causes screen 100 to flatten and the formation of the ribs or offsets results in screen 100 staying flat. The openings 30 or 104 can be made larger when screen 100 is provided with strip ribs, panel ribs, intermediate panels, and other reinforcing mechanisms of various embodiments, compared with a prior art side screen. Thus, there is a greater percentage of open space in screen 100, allowing greater visibility for an occupant of cab 20, according to various embodiments.

Although the present invention has been described with reference to preferred embodiments, workers skilled in the art will recognize that changes may be made in form and detail without departing from the spirit and scope of the invention.

What is claimed is:

1. A screen comprising:
an array of intersecting strips extending in first and second directions at a significant angle to each other and substantially in the plane of the screen, the array defining openings surrounded by the strips;
at least one panel section between the array and an edge of the screen;
a plurality of ribs disposed in the array of strips;
at least one panel section rib disposed on the panel section; and
at least one intermediate panel disposed in the array, wherein the intermediate panel is substantially wider than the strips.

2. The screen of claim 1, wherein at least one of the ribs protrudes along a first perpendicular direction relative to the screen, and at least a second of the ribs protrudes into a second perpendicular direction generally opposite to the first perpendicular direction.

3. The screen of claim 1, wherein the panel section forms a frame substantially surrounding the array.

4. A side screen configured for forming a side of a cab on a vehicle, the side screen comprising:
an array of generally vertical strips and generally horizontal strips, defining openings between the strips;
at least one intermediate panel disposed within the array;
a panel frame substantially surrounding the array, the panel frame comprising at least one panel section;
a plurality of ribs disposed in the array of strips; and
at least one panel rib disposed on the panel frame; wherein the plurality of ribs disposed in the array and the panel rib protrude in a direction substantially perpendicular to the screen, wherein the intermediate panel section is significantly wider than the strips, and extends from a first position of the panel frame to a substantially opposing section of the panel frame.

5. A side screen configured for forming a side of a cab on a vehicle, the side screen comprising:
a metal sheet having a generally planar first major surface and a parallel generally planar second major surface;
a plurality of apertures in the sheet extending from the first major surface to the second major surface, the apertures defining an array of strips therebetween; and
at least one reinforcing deformation disposed on the sheet for relieving stresses on the sheet induced by the formation of the apertures in the sheet, thereby retaining the sheet in a flat condition, the reinforcing deformation protruding from the first major surface of the sheet.

6. The side screen of claim 5, wherein the reinforcing deformation comprises a rib on the first major surface and a complementary recess on the second major surface.

7. The side screen of claim 5, wherein the reinforcing deformation protrudes along a first direction relative to the screen.

8. The side screen of claim 7, wherein at least a second reinforcing deformation protrudes along a second direction relative to the screen that is perpendicular to the first direction.

9. The side screen of claim 5, wherein the reinforcing deformation is disposed on a strip of the array of strips.

10. The side screen of claim 9, wherein the reinforcing deformation extends across the strip from a first aperture to a second aperture.

11. The side screen of claim 9, wherein the reinforcing deformation extends across the strip between vertically adjacent apertures.

12. The side screen of claim 9, wherein the reinforcing deformation extends across the strip between horizontally adjacent apertures.

13. The side screen of claim 5, further comprising at least one panel section between the array and an edge of the screen, the reinforcing deformation being disposed on the panel section.

14. The side screen of claim 5, further comprising an intermediate panel disposed within the array.

15. The side screen of claim 5, wherein the reinforcing deformation is formed by pressing the sheet between a punch member and a die member.

16. A work vehicle comprising:
a frame supported for movement over the ground;
an operator cab supported by the frame; and
a side screen forming a side of the cab, the side screen including:
  a metal sheet having a generally planar first major surface and a parallel generally planar second major surface;
  a plurality of apertures in the sheet extending from the first major surface to the second major surface, the apertures defining an array of strips therebetween; and
  at least one reinforcing deformation disposed on the sheet for relieving stresses on the sheet induced by the formation of the apertures in the sheet, thereby retaining the sheet in a flat condition, the reinforcing deformation including a rib protruding from the first major surface and a complementary recess on the second major surface.

17. The work vehicle of claim 16, wherein the reinforcing deformation protrudes along a first direction relative to the screen.

18. The work vehicle of claim 17, wherein at least a second reinforcing deformation protrudes along a second direction relative to the screen that is perpendicular to the first direction.

19. The work vehicle of claim 16, wherein the reinforcing deformation is disposed on a strip of the array of strips.

20. The work vehicle of claim 19, wherein the reinforcing deformation extends across the strip from a first aperture to a second aperture.

21. The work vehicle of claim 19, wherein the reinforcing deformation extends across the strip between vertically adjacent apertures.

22. The work vehicle of claim 19, wherein the reinforcing deformation extends across the strip between horizontally adjacent apertures.

23. The work vehicle of claim 16, further comprising at least one panel section between the array and an edge of the screen, the reinforcing deformation being disposed on the panel section.

24. The work vehicle of claim 16, further comprising an intermediate panel disposed within the array.

25. The work vehicle of claim 16, wherein the reinforcing deformation is formed by pressing the sheet between a punch member and a die member.

* * * * *